(12) United States Patent
Park et al.

(10) Patent No.: US 8,436,892 B2
(45) Date of Patent: May 7, 2013

(54) IMAGE DATA OBTAINING METHOD AND APPARATUS THEREFOR

(75) Inventors: Hyun-soo Park, Seoul (KR); Wook-yeon Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 12/612,804

(22) Filed: Nov. 5, 2009

(65) Prior Publication Data

US 2010/0188484 A1 Jul. 29, 2010

(30) Foreign Application Priority Data

Jan. 29, 2009 (KR) .................. 10-2009-0006984

(51) Int. Cl.
*H04N 13/02* (2006.01)
(52) U.S. Cl.
USPC .................. 348/46; 348/49; 348/52
(58) Field of Classification Search .............. 348/46, 348/49, 52
See application file for complete search history.

(56) References Cited

U.S. PATENT DOCUMENTS

| | | | |
|---|---|---|---|
| 2003/0035090 A1* | 2/2003 | Imai et al. | 355/53 |
| 2005/0036779 A1* | 2/2005 | Iwane | 396/111 |
| 2007/0223910 A1* | 9/2007 | Aoki et al. | 396/301 |
| 2009/0052730 A1* | 2/2009 | Lin | 382/100 |
| 2009/0268084 A1* | 10/2009 | Kametani et al. | 348/370 |
| 2010/0110209 A1* | 5/2010 | Border et al. | 348/222.1 |
| 2010/0157082 A1* | 6/2010 | Katerberg | 348/222.1 |

FOREIGN PATENT DOCUMENTS

| | | |
|---|---|---|
| GB | 2 434 937 A | 8/2007 |
| JP | 07-284128 KR | 10/1995 |
| KR | 10-2003-0019988 | 3/2003 |
| KR | 10-2005-0118005 | 12/2005 |
| WO | WO 2006/125975 A1 | 11/2006 |

OTHER PUBLICATIONS

International Search Report issued of Aug. 5, 2010, in corresponding PCT international Application No. PCT/KR2009/007923 (7 pages).
Veeraraghavan et al. "*Dappled Photography: Mask Enhanced Cameras for Heterodyned Light Fields and Coded Aperture Refocusing*" ACM Transactions on Graphics, Jul. 2007.
Pentland et al. "*Simple range cameras based on focal error*", J. Opt. Soc. Am. A, vol. 11, No. 11, Nov. 1994.
Levin, A., et al, "Image and Depth from a Conventional Camera with a coded Aperture," ACM Transactions of Graphics, vol. 26, No. 3, Article 70, pp. 70-1-70-9, XP-002622004, (Jul. 2007) (9 pages, in English).
Steinbach, A., et al., "Improved depth resolution with one-dimensional coded aperture imaging," Journal of Physics D: Applied Physics, vol. 12, pp. 2079-2099, XP-002462844, (1979) (21 Pages, in English).
European Search Report Issued Mar. 22, 2013 in counterpart European Patent Application No. 09 839 347.3 (7 Pages, in English).

* cited by examiner

*Primary Examiner* — Djenane Bayard
(74) *Attorney, Agent, or Firm* — NSIP Law

(57) ABSTRACT

An image data obtaining method and apparatus therefore, where the image data obtaining method involves determining an image-capturing mode from among a first image-capturing mode for capturing an image of a target subject by using a filter having a first area for transmitting light and a second area for blocking light, and a second image-capturing mode for capturing the image of the target subject without using the filter; capturing the image of the target subject by selectively using the filter according to the determined image-capturing mode; and processing captured image data.

12 Claims, 3 Drawing Sheets

IMAGE DATA OBTAINING METHOD AND APPARATUS THEREFOR

CROSS-REFERENCE TO RELATED APPLICATION

This application claims the benefit of Korean Patent Application No. 10-2009-0006984, filed on Jan. 29, 2009 in the Korean Intellectual Property Office, the disclosure of which is incorporated herein in its entirety by reference.

BACKGROUND OF THE INVENTION

1. Field of the Invention

An aspect of the present invention relates to an image data obtaining method and apparatus therefore, and more particularly, to an image data obtaining method and apparatus therefore to obtain three-dimensional (3D) image data.

2. Description of the Related Art

Due to developments in information communication technologies, three-dimensional (3D) image technologies have become more widespread. 3D image technology is aimed at forming a realistic image by applying depth information to a two-dimensional (2D) image.

Since human eyes are separated in a horizontal direction by a predetermined distance, a 2D image is viewed differently when viewed by a left eye and a right eye, respectively, such that binocular disparity occurs. The human brain combines the differently viewed 2D images, and thus generates a 3D image having the appearance of perspective and reality. In order to provide a 3D image, 3D image data including depth information may be generated, or 2D image data may be converted to generate 3D image data.

SUMMARY OF THE INVENTION

An aspect of the present invention provides an image data obtaining method and apparatus therefore to obtain three-dimensional (3D) image data According to an aspect of the present invention, there is provided an image data obtaining apparatus including a mode determining unit for determining an image-capturing mode, wherein the image-capturing mode is from among a first image-capturing mode for capturing an image of a target subject by using a filter including a first area for transmitting light and a second area for blocking light, and a second image-capturing mode for capturing an image of the target subject without using the filter; an image-capturing unit for capturing an image of the target subject by selectively using the filter according to the determined image-capturing mode obtained by the mode determining unit; and an image processing unit for processing captured image data.

According to an aspect of the present invention, the filter may include a liquid crystal in which a shape of the first area or a shape of the second area is changed according to an electrical signal applied to the filter, and the image-capturing unit may include a control unit for controlling the second area to be removed from the filter by applying the electrical signal to the filter when the second image-capturing mode is determined.

According to an aspect of the present invention, the filter may be formed of a plurality of filter pieces, ends of which are attached to the image data obtaining apparatus, and the image-capturing unit may include a control unit for controlling the plurality of filter pieces to be positioned in a path for receiving light that is necessary for an image-capturing operation when the first image-capturing mode is determined, and for controlling the plurality of filter pieces to be removed from the path when the second image-capturing mode is determined.

According to an aspect of the present invention, the image processing unit may obtain depth information indicating a distance between the image data obtaining apparatus and the target subject, by analyzing the captured image data.

According to an aspect of the present invention, the image processing unit may remove distortion from the captured image data according to information about the shapes of the first and second areas.

According to an aspect of the present invention, the image-capturing mode may be determined by referring to at least one from among a user input and an image-capturing environment.

According to another aspect of the present invention, there is provided an image data obtaining method including the operations of determining an image-capturing mode, wherein the image-capturing mode is from among a first image-capturing mode for capturing an image of a target subject by using a filter including a first area for transmitting light and a second area for blocking light, and a second image-capturing mode for capturing an image of the target subject without using the filter; capturing an image of the target subject by selectively using the filter according to a result of the determining; and processing captured image data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
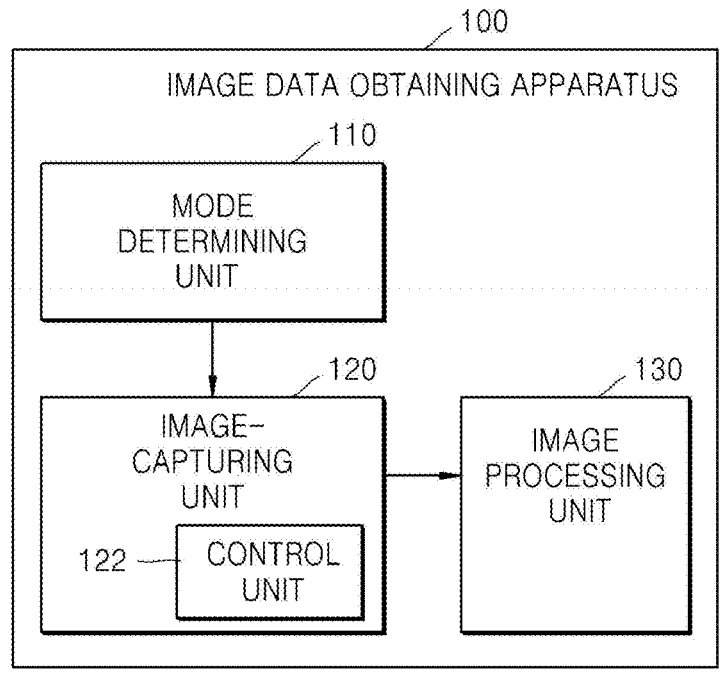
FIG. 1 is a block diagram of an image data obtaining apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to generate three-dimensional (3D) image data by using two-dimensional (2D) image data, information is necessary to indicate a distance between a target object and a camera. With respect to each of pixels constituting the 2D image data, the necessary information includes depth information indicating how far the camera is from an object indicated by each of the pixels.

In order to obtain depth information, four methods mentioned below may be used.

The first method to obtain depth information, between the target object and the camera, is by analyzing the shape of a captured image of the target object. The first method is economical in view of using a piece of 2D image data, but is problematic with respect to implementation of an object shape analyzing method and apparatus therefore such that the first method is difficult in view of practicability.

The second method to obtain depth information, between the target object and the camera, is by analyzing at least two pieces of 2D image data obtained by capturing images of the same target object from different angles. The second method is easy to implement, and thus is generally used. However, in order to capture images of the same target object from different angles, an image-capturing device (e.g., a camera) is required to have a plurality of optical systems having different optical paths. Since optical systems are expensive items, it is not economical for an image-capturing device to have two or more optical systems.

The third method to obtain depth information is by analyzing at least two pieces of 2D image data obtained by capturing images of the same target object. The research conducted by A. Pentland, S. Scherock, T. Darrell, and B. Girod and titled "Simple range cameras based on focal error" discloses a method to obtain depth information by analyzing a focused image and a non-focused image. Equation 1 below is from the aforementioned research and may be used to obtain depth information by using at least two pieces of 2D image data.

$$d_o = \frac{fD}{D - f - 2krf_{number}} \quad \text{Equation 1}$$

Referring to Equation 1, f indicates a focus value of a camera lens, D indicates a distance between a camera and an image plane that is positioned between lenses, r indicates a radius of an area in which a captured image of a target object looks dim due to a focus error, k indicates a transform constant, and $f_{number}$ indicates an f value of the camera, wherein the $f_{number}$ is calculated by dividing a focal length of the camera lens by a lens aperture. In this regard, the aforementioned values, except for the r value, are related to physical conditions of the camera, and thus may be obtained when a capturing operation is performed. Hence, depth information may be obtained when the r value is obtained from the captured target image.

The third method is economical since it uses only one optical system. However, it is inconvenient due to the fact that at least two or more pieces of image data have to be obtained.

The fourth method to obtain depth information is by intentionally distorting an image by using a filter for blocking a portion of light, and then by analyzing distortion characteristics. An image data obtaining apparatus 100 using the fourth method, which obtains the depth information by intentionally distorting the image and then by using the distorted image, will now be described with reference to FIG. 1.

FIG. 1 is a block diagram of the image data obtaining apparatus 100 according to an embodiment of the present invention. The image data obtaining apparatus 100 according to the present embodiment includes a mode determining unit 110, an image-capturing unit 120, and an image processing unit 130. While not required in all aspects, the units 110, 120, 130 can be processors implementing software and/or firmware.

The mode determining unit 110 determines an image-capturing mode according to the use of a filter including a first area for transmitting light and a second area for blocking light. Hereinafter, for convenience of description with respect to the image-capturing mode, a case in which an image of a target subject is captured by using the filter is referred to as a first image-capturing mode, and a case in which an image of a target subject is captured without using the filter is referred to as a second image-capturing mode.

In order to obtain general image data by using the image data obtaining apparatus 100, the image-capturing mode is set as the second image-capturing mode and then an image of the target subject is captured. However, in order to obtain 3D image data or clear 2D image data by using the image data obtaining apparatus 100, the first image-capturing mode is set and then an image of the target subject is captured.

When the image of the target subject is captured using the filter, a portion of light incident on a lens in the image data obtaining apparatus 100 is blocked by the filter. That is, light passing through the first area in the filter is transmitted, but light passing through the second area in the filter is blocked. Thus, if an image of the target subject is captured while using the filter, a distorted image is obtained.

A shape of the filter may vary provided that the filter includes the first area for transmitting the light and the second area for blocking the light so as to obtain a distorted image.

For example, the filter may be formed of a plurality of filter pieces, ends of which are attached to the image data obtaining apparatus 100. In this case, if the first image-capturing mode is set, the plurality of filter pieces are positioned in a path for passing light that is necessary for an image-capturing operation. On the other hand, if the second image-capturing mode is set, the plurality of filter pieces are removed from the path for passing the light that is necessary for the image-capturing operation.

While the image data obtaining apparatus 100 can be connected to a camera to receive the image therefrom, the image data obtaining apparatus 100 may be a camera. In this embodiment, an end of each of the plurality of filter pieces may be attached to a barrel of the camera. At this time, the filter pieces are arranged to rotate or to move while being attached to the barrel. When the first image-capturing mode is set, the filter pieces are gathered and positioned at a front end of a lens of the camera so as to block a portion of light incident on the lens, so that a distorted image is obtained. When the second image-capturing mode is set, the filter pieces are disassembled and removed from the front end of the lens so that a general image is obtained. A case in which the filter is formed of the plurality of filter pieces will be described in detail in relation to FIGS. 2A through 2C and FIGS. 3A through 3D.

Furthermore, the filter may be formed of a liquid crystal having characteristics that may be changed by receiving an electrical signal. The filter may be embodied in such a manner that one of the first and second areas in the filter may be removed or shapes of the first and second areas are changed when the electrical signal is applied to the filter. For example, when the electrical signal is less than a threshold value, both the first area and the second area may exist in the filter. However, when the electrical signal is greater than the threshold value, only the first area may exist in the filter. Thus, when an electrical signal greater than the threshold value is applied to the filter, only the first area exists in the filter and therefore an image of a target subject is obtained in the same manner as a case in which an image of the target subject is captured while not using the filter. On the other hand, when an electrical signal less than the threshold value is applied to the filter, the second area also exists in the filter and therefore a portion of light is blocked by the second area, and thus a distorted image is obtained.

In another embodiment, only the first area may exist in the filter when the electrical signal less than the threshold value is applied to the filter, and both the first area and the second area may exist in the filter when the electrical signal greater than the threshold value is applied to the filter.

The mode determining unit 110 may determine the image-capturing mode according to a user input. However, without a user input, the mode determining unit 110 may automatically determine the image-capturing mode according to an image-capturing environment. For example, a very dark image is obtained when the filter is used in a place with a low amount of light, thus, in a place with a low amount of light, the mode determining unit 110 may determine the second image-capturing mode, and in a place with a great amount of light, the mode determining unit 110 may determine the image-capturing mode as the first image-capturing mode.

According to the determination by the mode determining unit 110, the image-capturing unit 120 captures an image of a target subject by selectively using the filter. The image-capturing unit 120 may include a control unit 122 for controlling the filter according to the image-capturing mode.

Hereinafter, as aspect of the invention in which the filter is formed of the plurality of filter pieces will be described. When the first image-capturing mode is set, the control unit 122 controls the plurality of filter pieces to be positioned in a path for passing light. As described above, the image data obtaining apparatus 100 may be a camera, and in this case, the control unit 122 controls the plurality of filter pieces to be positioned at the front end of the lens so as to block a portion of the light incident on the lens. When the second image-capturing mode is set, the control unit 122 removes the plurality of filter pieces from the path for passing light.

Hereinafter, a case in which the filter is formed of a liquid crystal having characteristics that may be changed by receiving an electrical signal will be described. When the first image-capturing mode is set, the control unit 122 does not apply an electrical signal to the filter. When the second image-capturing mode is set, the control unit 122 controls the second area to be removed from the filter by applying an electrical signal to the filter.

The image processing unit 130 processes captured image data. When the second image-capturing mode is set, the image processing unit 130 performs an image processing operation the same way as performed by a general image-capturing apparatus, such as a camera. When the first image-capturing mode is set, the image processing unit 130 may perform an additional image processing operation. For example, the image processing unit 130 may obtain depth information indicating a distance between the image data obtaining apparatus 100 and the target subject, by using information about shapes of the filter and the captured image data.

Also, the image processing unit 130 may remove distortion from captured image data according to the information about the shapes of the filter. Since a distortion characteristic with respect to the captured image data varies according to the shapes of the filter, the distortion may be removed from the captured image data according to the distortion characteristic. In July 2007, the research published in 'ACM Transactions on Graphics' and titled "Dappled Photography: Mask Enhanced Cameras for Heterodyned Light Fields and Coded" discloses a method to obtain 2D image data of which distortion is removed by using image distortion caused by a filter, or to generate 3D image data. However, a method of obtaining 3D image data according to the present invention is not limited to the aforementioned research disclosing the method to remove distortion from 2D image data and to obtain 3D image data by using the 2D image data of which distortion is removed.

Figure 2A:
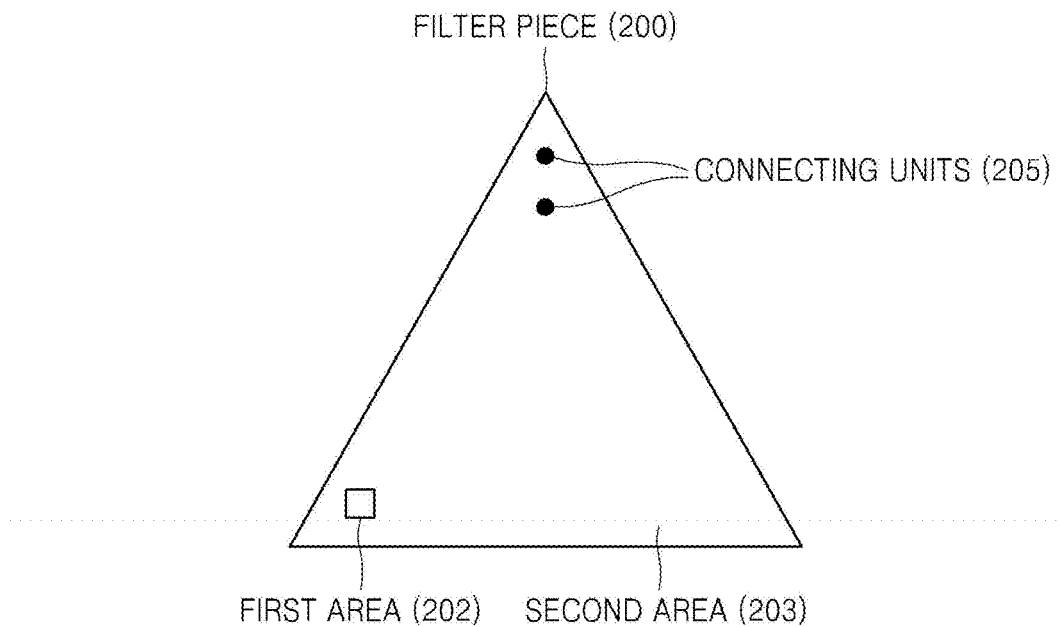
FIGS. 2A through 2C are diagrams for illustrating a filter according to an embodiment of the present invention.
Figure 2B:
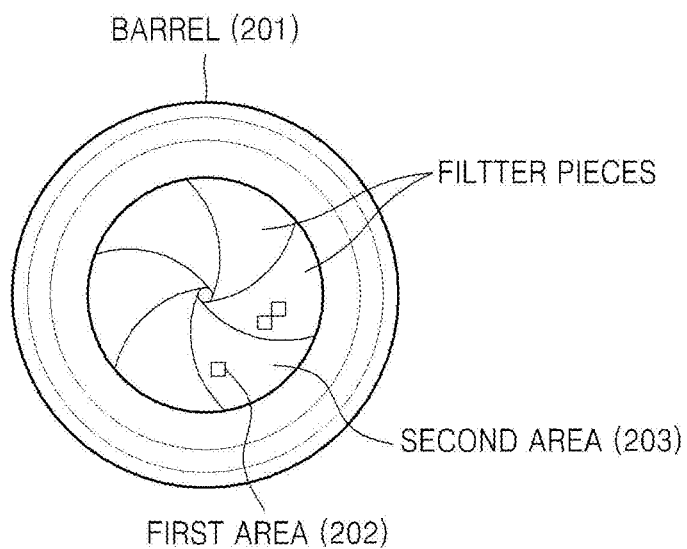
Figure 2C:
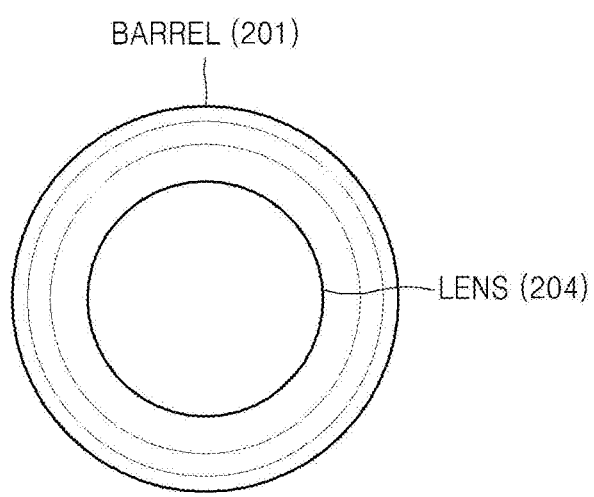
Figure 3A:
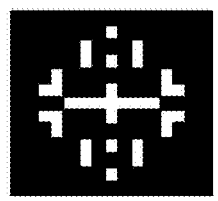
FIGS. 3A through 3D illustrate shapes of a filter according to embodiments of the present invention.
Figure 3B:
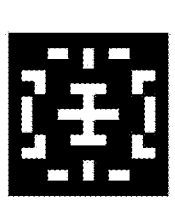
Figure 3C:
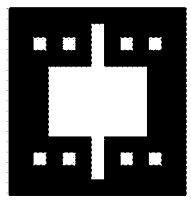
Figure 3D:
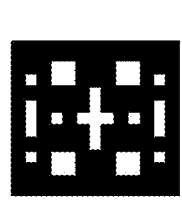

FIGS. 2A through 2C are diagrams for illustrating a filter according to another embodiment of the present invention. The filter is formed of a plurality of filter pieces. With respect to the present embodiment of FIGS. 2A through 2C, it is assumed that the image data obtaining apparatus 100 is a camera having a lens assembly. The lens assembly includes lens 204 illustrated in FIG. 2C, for receiving light, and a barrel 201, also illustrated in FIG. 2C, surrounding the lens 204.

FIG. 2A is a diagram of a filter piece 200 that is one of the plurality of filter pieces forming the filter. Referring to FIG. 2A, the filter piece 200 includes connecting units 205, a first area 202, and a second area 203.

The number of filter pieces 200 forming the filter may vary. According to the shown example in FIG. 2B, the number of filter pieces 200 is 6.

The connecting units 205 connect the barrel 201 and the filter piece 200, and may be designed to enable the filter piece 200 to rotate or to move while being attached to the barrel 201.

Each filter piece 200 need not include the first area 202 for transmitting light. However, when the plurality of filter pieces 200 forming the filter are gathered, two or more first areas 202 may exist in a gathering of the filter pieces 200.

The second area 203 functions to block light.

FIG. 2B is a diagram for illustrating a lens assembly of the image data obtaining apparatus 100, illustrated in FIG. 1, in which the first image-capturing mode is set. While not required in all aspects, the lens assembly can be detachable from the camera or apparatus 100, and therefore can be separately provided.

When the first image-capturing mode is set, the control unit 122 controls the six filter pieces 200 to be gathered and positioned at a front end of the lens 204, and thus controls a portion of incident light to be blocked. When the six filter pieces are gathered and positioned at the front end of the lens 204, the light incident on the first area 202 is transmitted and the light incident on the second area 203 is blocked.

FIG. 2C is a diagram for illustrating the lens assembly of the image data obtaining apparatus 100 in which the second image-capturing mode is set. When the second image-capturing mode is set, the control unit 122 controls the six filter pieces 200 to be removed from the front end of the lens 204. For example, the control unit 122 may control the six filter pieces 200 to be folded and inserted into the barrel 201. In this case, the light incident on the lens 204 is not blocked so that general image data may be obtained.

FIGS. 3A through 3D illustrate shapes of a filter according to embodiments of the present invention. In FIGS. 3A through 3D, a plurality of white areas in the filter indicate a first area for transmitting light, and a plurality of black areas in the filter indicate a second area for blocking light. According to shapes of the first and second areas, a distortion characteristic with respect to image data varies. In this regard, it is described above that the image processing unit 130 may obtain 3D image data by using the distortion characteristic. The shapes of the filter are not limited to the embodiments of FIGS. 3A through 3D, and thus may vary.

Figure 4:
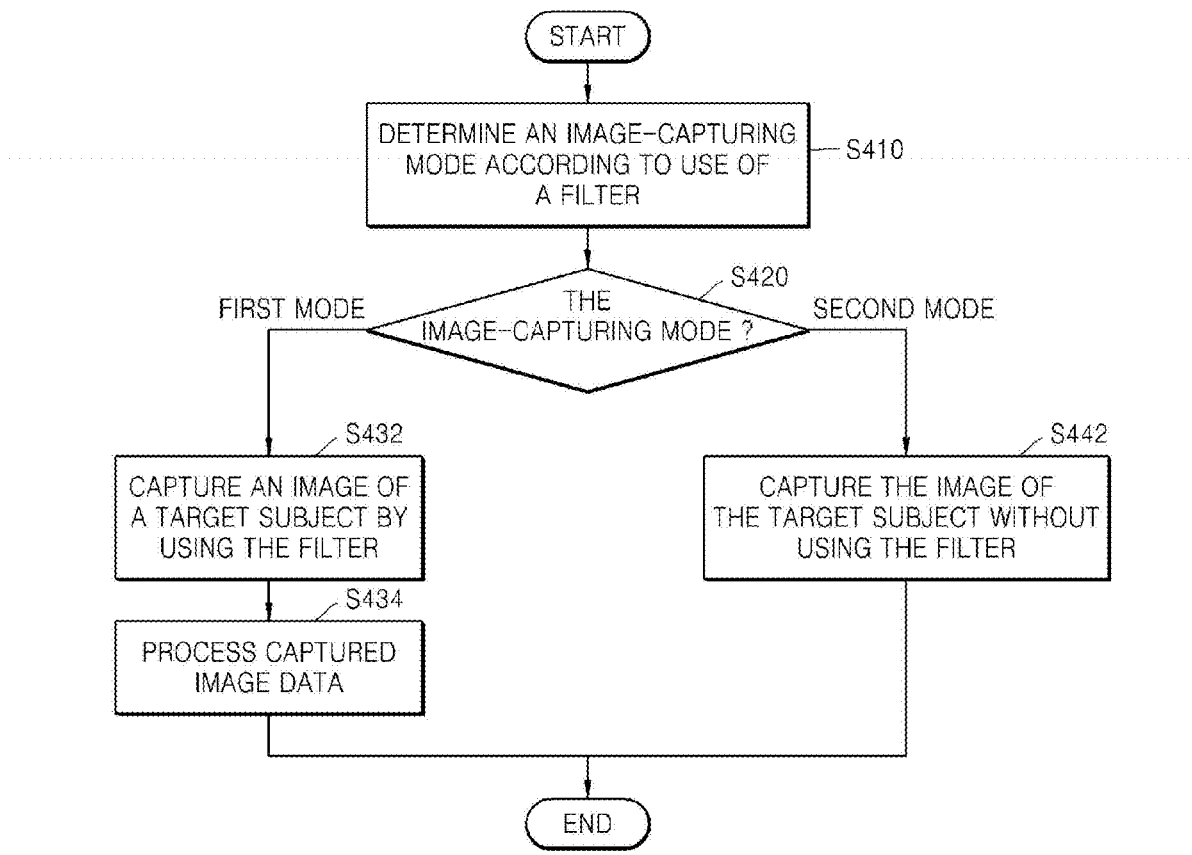
FIG. 4 is a flowchart of an image data obtaining method, according to an embodiment of the present invention.

FIG. 4 is a flowchart of an image data obtaining method, according to an embodiment of the present invention.

In operation S410, an image-capturing mode is determined according to use of a filter. The filter includes a first area for transmitting light, and a second area for blocking light. Here, the number of the second areas may be equivalent to or greater than 2. The filter has a shape that varies according to one or more embodiments.

The filter may be formed of a liquid crystal having characteristics that may be changed by receiving an electrical signal. In this case, according to the electrical signal applied to the filter, at least one of shapes of the first and second areas may be changed. To be more specific, when the electrical signal is less than a threshold value, a portion of the filter is formed of a transmissive material, and the remaining portions of the filter is formed of a reflective material. However, when the electrical signal is greater than the threshold value, all portions of the filter may be formed of the transmissive material.

Also, the filter may be formed of a plurality of filter pieces, ends of which are attached to an image data obtaining apparatus. At this time, it is not necessary for each of the plurality of filter pieces to include the first area but, when the plurality of filter pieces are connected to each other, two or more first areas may exist in a gathering of the plurality of filter pieces. In addition, the plurality of filter pieces attached to the image data obtaining apparatus may be embodied in such a manner that the plurality of filter pieces may rotate or move.

Hereinafter, for convenience of description with respect to the image-capturing mode, a case in which an image of a target subject is captured while using the filter is referred to as a first image-capturing mode, and a case in which an image of a target subject is captured while not using the filter is referred to as a second image-capturing mode.

The image-capturing mode may be determined according to a user input. However, without the user input, the image-capturing mode may be determined according to an image-capturing environment such as an amount of light.

In operation S420, it is determined whether the image-capturing mode is the first image-capturing mode or the second image-capturing mode. When the first image-capturing mode is determined, operation S432 is performed, and when the second image-capturing mode is determined, operation S442 is performed.

In operation S432, the image of the target subject is captured by using the filter, and in operation S442, the image of the target subject is captured without using the filter. To be more specific, in a case where the filter is formed of the liquid crystal having characteristics that may be changed by receiving an electrical signal, the strength of the electrical signal applied to the filter is adjusted according to the image-capturing mode, and then the image of the target subject is captured. Also, in the case where the filter is formed of the plurality of filter pieces, the plurality of filter pieces are controlled to be gathered and positioned in a path for receiving light that is necessary for an image-capturing operation, or to be removed from the path, according to the image-capturing mode.

In operation S434, captured image data is processed. When the image of the target subject is captured by using the filter, distorted image data is obtained. Here, a distortion characteristic may vary according to shapes of the filter. Thus, by removing distortion from the captured image data according to the distorted image data and the shape of the filter, high quality image data may be obtained. Also, by analyzing the distorted image data, depth information indicating a distance between the image data obtaining apparatus and the target subject may be obtained.

The embodiments of the present invention can be written as computer programs and can be implemented in general-use and special purpose digital computers and/or processors that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An image data obtaining apparatus comprising:
a mode determining unit for determining an image-capturing mode, wherein the image-capturing mode is selectable between a first image-capturing mode for capturing an image of a target subject using a filter comprising a first area for transmitting light and a second area for blocking light, and a second image-capturing mode for capturing an image of the target subject without using the filter;
an image-capturing unit for capturing the image of the target subject by selectively using the filter according to the image-capturing mode determined by the mode determining unit; and
an image processing unit for processing captured image data, wherein:
the filter is formed of a plurality of filter pieces, ends of which are attached to the image data obtaining apparatus, and
the image-capturing unit comprises a control unit controlling the plurality of filter pieces to be physically positioned in a path for receiving light that is necessary for an image-capturing operation when the image-capturing mode is determined as the first image-capturing mode and for controlling the plurality of filter pieces to be physically removed from the path when the image-capturing mode is determined as the second image-capturing mode.

2. The image data obtaining apparatus of claim 1, wherein the image processing unit obtains depth information indicating a distance between the image data obtaining apparatus and the target subject, by using information for the filter and the image data captured under the first image-capturing mode.

3. The image data obtaining apparatus of claim 1, wherein the image processing unit removes distortion from the captured image data according to information about the shapes of the first and second areas when the image is captured in the first image capturing mode.

4. The image data obtaining apparatus of claim 1, wherein the image-capturing mode is determined according to a user input and/or an image-capturing environment.

5. The image data obtaining apparatus of claim 1, further comprising a lens assembly including a lens and a barrel surrounding the lens for capturing the image data, wherein the filter pieces are gathered and positioned at a front end of the lens so as to block a portion of light incident on the lens in order to obtain a distorted image in the first image-capturing mode, and wherein the filter pieces are disassembled and removed from the front end of the lens so as to obtain the image in the second image-capturing mode.

6. An image data obtaining method, comprising:
determining an image-capturing mode, wherein the image-capturing mode is selectable between a first image-capturing mode for capturing an image of a target subject by using a filter formed of a plurality of filter pieces and comprising a first area for transmitting light and a second area for blocking light, and a second image-capturing mode for capturing an image of the target subject without using the filter;

capturing the image of the target subject by selectively using the filter according to the determined image-capturing mode;

processing captured image data; and controlling the plurality of filter pieces to be physically positioned in a path for receiving light that is necessary for an image-capturing operation when the first image-capturing mode is determined and controlling the plurality of filter pieces to be physically removed from the path when the second image-capturing mode is determined.

7. The image data obtaining method of claim 6, wherein the processing comprises obtaining depth information indicating a distance between an image data obtaining apparatus and the target subject, by using information for the filter and the image data captured under the first image-capturing mode.

8. The image data obtaining method of claim 6, wherein the processing comprises removing distortion from the captured image data according to information about the shapes of the first and second areas when the image is captured in the first image capturing mode.

9. The image data obtaining method of claim 6, wherein the image-capturing mode is determined according to a user input and/or an image-capturing environment.

10. A non-transitory computer readable recording medium having recorded thereon a program for executing the method of claim 6, using at least one processor.

11. A lens assembly for use with an image data obtaining apparatus selectable between first and second first image-capturing modes, the assembly comprising:

a barrel connectable to the image data obtaining apparatus;

a lens for capturing image data;

a filter positioned at the lens and which the image data obtaining apparatus controls to block a portion of light incident on the lens in order to obtain a distorted image in the first image-capturing mode used by the image data obtaining apparatus to obtain 3D image data from the distorted image, and to not block the light incident on the lens so as to obtain a general image in the second image-capturing mode, wherein the filter is formed of a plurality of filter pieces, ends of which are attached to the barrel; and a control unit controlling the plurality of filter pieces to be physically positioned in a path for receiving light that is necessary for an image-capturing operation when the image-capturing mode is the first image-capturing mode and for controlling the plurality of filter pieces to be physically removed from the path when the image-capturing mode is the second image-capturing mode.

12. The lens assembly of claim 11, wherein the filter pieces are gathered and positioned at a front end of the lens so as to block a portion of light incident on the lens in order to obtain the distorted image in the first image-capturing mode, and are disassembled and removed from the front end of the lens so as to obtain the general image in the second image-capturing mode.

* * * * *